(12) United States Patent
Patnaik (10) Patent No.: US 7,925,074 B2
(45) Date of Patent: Apr. 12, 2011

(54) ADAPTIVE BACKGROUND PROPAGATION METHOD AND DEVICE THEREFOR

(75) Inventor: Rohit Patnaik, Carlsbad, CA (US)

(73) Assignee: Teradyne, Inc., North Reading, MA (US)

( * ) Notice: Subject to any disclaimer, the term of this patent is extended or adjusted under 35 U.S.C. 154(b) by 988 days.

(21) Appl. No.: 11/731,715

(22) Filed: Mar. 30, 2007

(65) Prior Publication Data

US 2008/0089606 A1  Apr. 17, 2008

Related U.S. Application Data

(60) Provisional application No. 60/852,156, filed on Oct. 16, 2006.

(51) Int. Cl.
| | |
|---|---|
| *G06K 9/00* | (2006.01) |
| *G06K 9/34* | (2006.01) |
| *G06K 9/62* | (2006.01) |
| *G06K 9/40* | (2006.01) |
| *G06K 9/36* | (2006.01) |
| *G06K 9/20* | (2006.01) |
| *G06K 15/00* | (2006.01) |
| *H04N 9/47* | (2006.01) |
| *H04N 5/228* | (2006.01) |
| *H04N 1/405* | (2006.01) |

(52) U.S. Cl. ........ 382/149; 382/100; 382/128; 382/141; 382/168; 382/173; 382/224; 382/254; 382/282; 382/284; 348/87; 348/222.1; 358/3.13; 358/464; 358/465

(58) Field of Classification Search ............ 382/12–133, 382/141–153, 168, 169, 171–172, 254, 274–275; 348/87, 222.1; 358/3.13, 3.27, 464–465
See application file for complete search history.

(56) References Cited

U.S. PATENT DOCUMENTS

| | | | | |
|---|---|---|---|---|
| 5,528,703 A | * | 6/1996 | Lee | 382/257 |
| 5,561,695 A | | 10/1996 | Hu | |
| 5,561,696 A | * | 10/1996 | Adams et al. | 378/58 |
| 5,592,562 A | * | 1/1997 | Rooks | 382/150 |
| 5,594,770 A | | 1/1997 | Bowles et al. | |
| 6,567,542 B1 | * | 5/2003 | Koljonen et al. | 382/147 |
| 6,570,954 B2 | | 5/2003 | Rasche et al. | |
| 6,707,878 B2 | | 3/2004 | Claus et al. | |

(Continued)

FOREIGN PATENT DOCUMENTS

GB  2 408 887 A  6/2005

(Continued)

OTHER PUBLICATIONS

Huang et al., "A Fast Two Dimensional Median Filtering Algorithm", IEEE transactions on acoustics, speech and signal processing, 27(1), Feb. 1979.*

(Continued)

*Primary Examiner* — Vu Le
*Assistant Examiner* — Nathan Bloom
(74) *Attorney, Agent, or Firm* — Wolf, Greenfield & Sacks, P.C.

(57) ABSTRACT

In one implementation, a method for reducing reconstruction artifacts in a combined image constructed of a multiple images is provided. The method may include identifying pixels in images that are in a selected range. The identified pixels are replaced the with a substitute pixel value. The images with the substitute pixel values are combined to form a combined image having reduced reconstruction artifacts.

40 Claims, 5 Drawing Sheets

U.S. PATENT DOCUMENTS

| | | | |
|---|---|---|---|
| 6,748,046 B2 | 6/2004 | Thayer | |
| 6,813,374 B1 | 11/2004 | Karimi et al. | |
| 6,973,157 B2 | 12/2005 | Claus | |
| 6,996,265 B1* | 2/2006 | Patnaik | 382/149 |
| 7,013,038 B1* | 3/2006 | Patnaik | 382/145 |
| 2001/0046321 A1* | 11/2001 | Murakawa | 382/190 |
| 2003/0184730 A1* | 10/2003 | Price | 356/39 |
| 2004/0032516 A1* | 2/2004 | Kakarala | 348/246 |
| 2004/0062429 A1* | 4/2004 | Kaufhold | 382/132 |
| 2005/0041850 A1* | 2/2005 | Watkins et al. | 382/145 |
| 2005/0068450 A1 | 3/2005 | Steinberg et al. | |
| 2005/0105682 A1* | 5/2005 | Heumann et al. | 378/58 |
| 2005/0169514 A1 | 8/2005 | Prince | |
| 2005/0213838 A1* | 9/2005 | Kuramoto | 382/254 |
| 2005/0275747 A1 | 12/2005 | Nayar et al. | |
| 2006/0188141 A1* | 8/2006 | Patnaik | 382/145 |
| 2006/0228036 A1* | 10/2006 | Avinash | 382/254 |
| 2007/0019243 A1* | 1/2007 | Sato et al. | 358/3.27 |
| 2007/0071304 A1* | 3/2007 | Kuchii et al. | 382/141 |
| 2007/0165939 A1* | 7/2007 | Savareigo et al. | 382/145 |
| 2007/0280551 A1* | 12/2007 | Oztan et al. | 382/268 |
| 2008/0130983 A1* | 6/2008 | Patnaik | 382/145 |
| 2008/0292194 A1* | 11/2008 | Schmidt et al. | 382/217 |

FOREIGN PATENT DOCUMENTS

WO     WO 02/46729 A     6/2002

OTHER PUBLICATIONS

Weijer et al., " Local Mode Filtering", Proceedings IEEE Confernce CVPR 2001, vol. 2, pp. 428-433. 2001.*
PCT International Search Report for PCT/US2007/021983 entitled Adaptive Background Propagation Method and Device Therefor; published Jun. 5, 2008 as WO/2008048539 A3.

* cited by examiner (Prior Art)

FIG. 7

ADAPTIVE BACKGROUND PROPAGATION METHOD AND DEVICE THEREFOR

CROSS REFERENCE TO RELATED APPLICATION

This application claims the benefit of U.S. Provisional Application No. 60/852,156, filed on Oct. 16, 2006, by Rohit Patnaik, entitled ADAPTIVE BACKGROUND PROPAGATION METHOD AND DEVICE THEREFOR, herein incorporated by reference in its entirety.

BACKGROUND

The mounting of Integrated Circuits ("IC") chips on Printed Circuit Boards ("PCBs") requires inspection of the interconnections on the PCBs to determine whether the interconnections contain significant defects. Continual increases in the IC chip complexity, performance, and placement density place demands on the density and functionality of package interconnections. The Ball-Grid-Array ("BGA") is one example of a Surface-Mount-Technology ("SMT") package with interconnections that demand specialized inspection techniques. The continually increasing complexity and density of the PCB interconnections have resulted in the development of a number of interconnection inspection techniques for detecting defects on or within the interconnections.

One such interconnection inspection technique, tomosynthesis, is capable of detecting defects by creating a digital image representation of a sliced view along a single plane passing through a three-dimensional electrical solder joint connection. A digital tomosynthesis system makes it possible to inspect various PCB solder joint qualities, which cannot be inspected by visual methods or conventional X-ray radiography methods. U.S. Pat. No. 6,748,046 incorporated herein by reference, discloses a tomosynthesis inspection system. Also, U.S. Pat. No. 4,688,241 issued on Aug. 18, 1987 to Richard S. Peugeot, incorporated herein by reference, discloses a number of tomosynthesis inspection systems, including a system 10 depicted in FIG. 1 of the instant application. The system 10 includes a steerable microfocus X-ray source 12, a large-format image detector 30 capable of imaging X-rays, and an inspection plane 20 positioned between the source and the detector.

Figure 1:
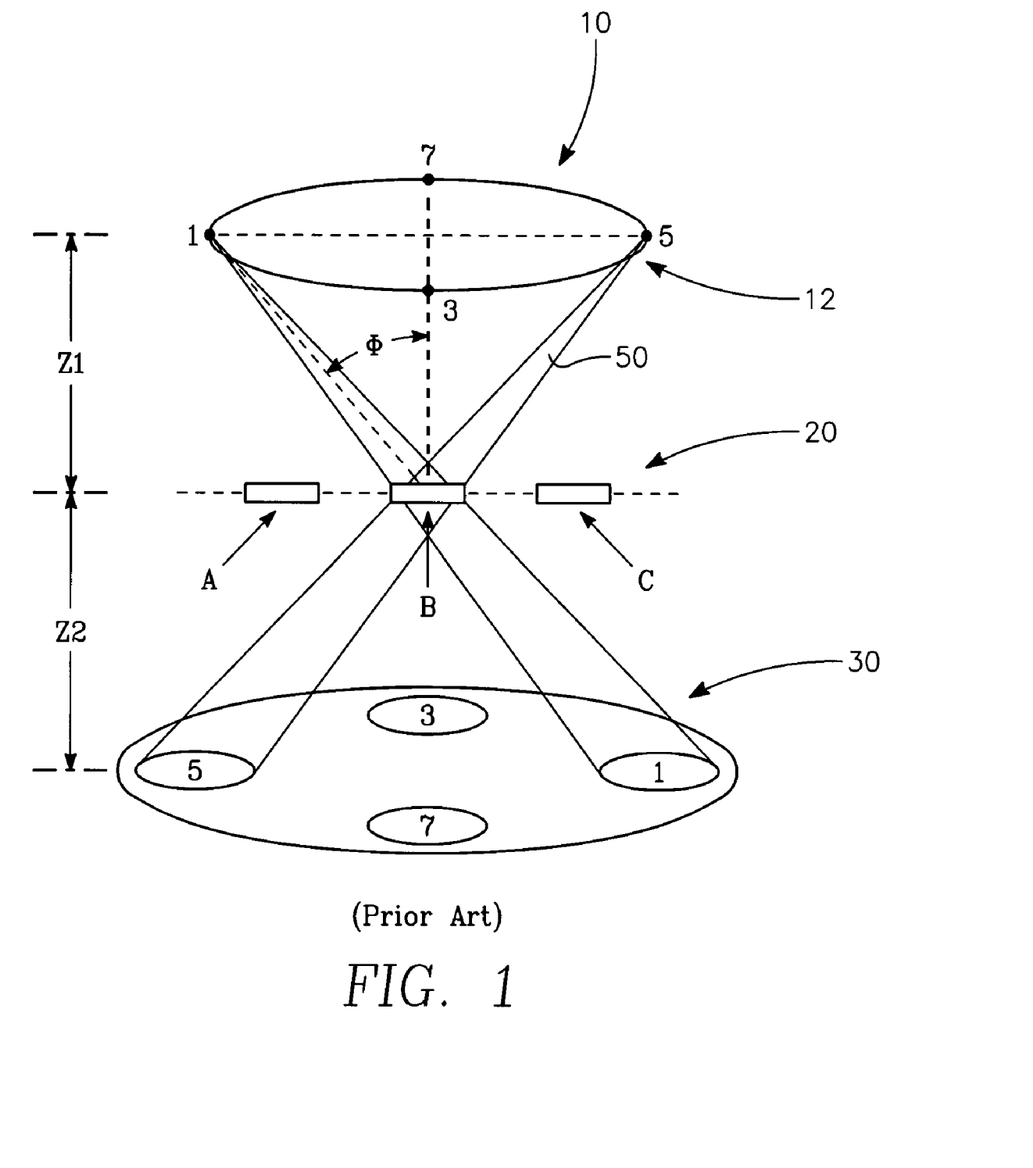
FIG. 1 shows a simplified diagram of a tomosynthesis inspection system.

The regions A, B, and C to be imaged may be placed on an X-Y table (not shown), which lies in the inspection plane 20. When an object is on the X-Y table, the test object may be translationally moved along the x and y directions so that a region of interest, such as a solder joint, can be imaged. The source 12 produces an X-ray beam 50 having sufficient energy to penetrate the test object and reach the detector 30, while also having a low enough energy so that a resulting image has contrast within the region of interest.

The X-ray source 12 and the detector 30 may be mounted on independent vertical drive mechanisms allowing a continuously variable field-of-view, ranging from approximately 2.5 mm by 2.5 mm to approximately 25 mm by 25 mm, to be obtained. In particular, the X-ray source 12 is mounted on a programmable Z-axis, which changes the distance between the X-ray source 12 and the inspection plane 20. The distance between the X-ray source 12 and the plane 20 is referred to herein as Z1. The detector is also mounted on a programmable Z-axis, which changes the distance between the inspection plane 20 and the detector 30. The distance between the inspection plane 20 and the detector 30 is referred to herein as Z2. Variation of the field of view may be accomplished by varying either or both distances Z1 and Z2.

In operation, a circuit board having regions of interest A, B, and C is positioned on the X-Y table, in the inspection plane 20. The board is then moved translationally along the x and y directions so that a region of interest A, B, or C, such as a solder joint, or a component can be imaged. Once the board is properly positioned, a beam of radiation, such as X-ray beam 50, is projected towards an object on the circuit board. A portion of the X-ray beam 50 transmits through and is modulated by the object.

The portion of the beam 50 that passes through the object then strikes the image detector 30. The detector 30 is capable of producing an X-ray shadowgraph containing the modulation information from the test object. The X-rays striking the input screen of the detector 30 produce a visible light or shadowgraph image of the volume of the object that falls within the X-ray beam 50. If the detector 30 includes an image intensifier, the image at the output of the image intensifier is amplified in brightness.

The image that appears on the output face of the detector 30 is viewed, through a mirror, by a video camera (not shown). The images from various regions of the detector 30, such as the regions numbered 1, 3, 5 and 7 in FIG. 1, may be sequentially directed to the camera by adjusting the position of the mirror.

The resulting images are then input into a video digitizer. The video digitizer provides as an output digitized image sets. Each image in the set is supplied to a memory and stored. The images may then be separately fed into a tomosynthesis computer, which is programmed with a known tomosynthesis algorithm that effects a combination of the images and provides a resultant image to a monitor. In order to improve the resolution of the digitized image sets, it is desirable to limit the field of view of the camera to a region of the detector 30, such as the regions 1, 3, 5 or 7, rather than to acquire images for tomosynthesis viewing the entire detector 30.

For system 10, the center of the region of interest must coincide with a line extending from the center of the path of the x-ray source to the center of the detector 30. As can be seen in FIG. 1, the center of object B coincides with the centerline of X-ray beam 50 and the center of the field of view of detector 30.

To acquire tomosynthetic images for object B, for example, the X-ray source 12 is positioned at multiple points 1-8 along a circular path that is perpendicular to the Z axis. Each point on the circle falls in a plane that is perpendicular to the Z axis and maintains the same angle with, or is equidistant from, the Z axis. At each point, the X-ray source 12 emits an X-ray beam 50 towards, and at least partially through, the object B, thereby generating an image of object B at the detector 30. For example, to acquire image 1 for object B, the X-ray source 12 is steered to position 1 and the detector field of view is moved to position 1. This process is repeated for images 2 through 8 of object B. The 8 images are acquired sequentially since the electron beam inside the X-ray source housing and the detector field of view must be moved after each acquisition. As a result, 8 scanned images of object B at a known pre-determined angle are captured.

After the required images of object B are taken, then the X-Y table is moved so that the center of object A coincides with the centerline of the X-ray beam 50 and the center of the detector field of view. To acquire image 1 for object A, the X-ray source 12 is steered to position 1 and the detector field of view is moved to position 1. This process is repeated for images 2 through 8 of object A. Thus, 8 scanned images of object A are captured. This process is continued for each of the objects, or regions of interest, to be imaged.

Figure 2:
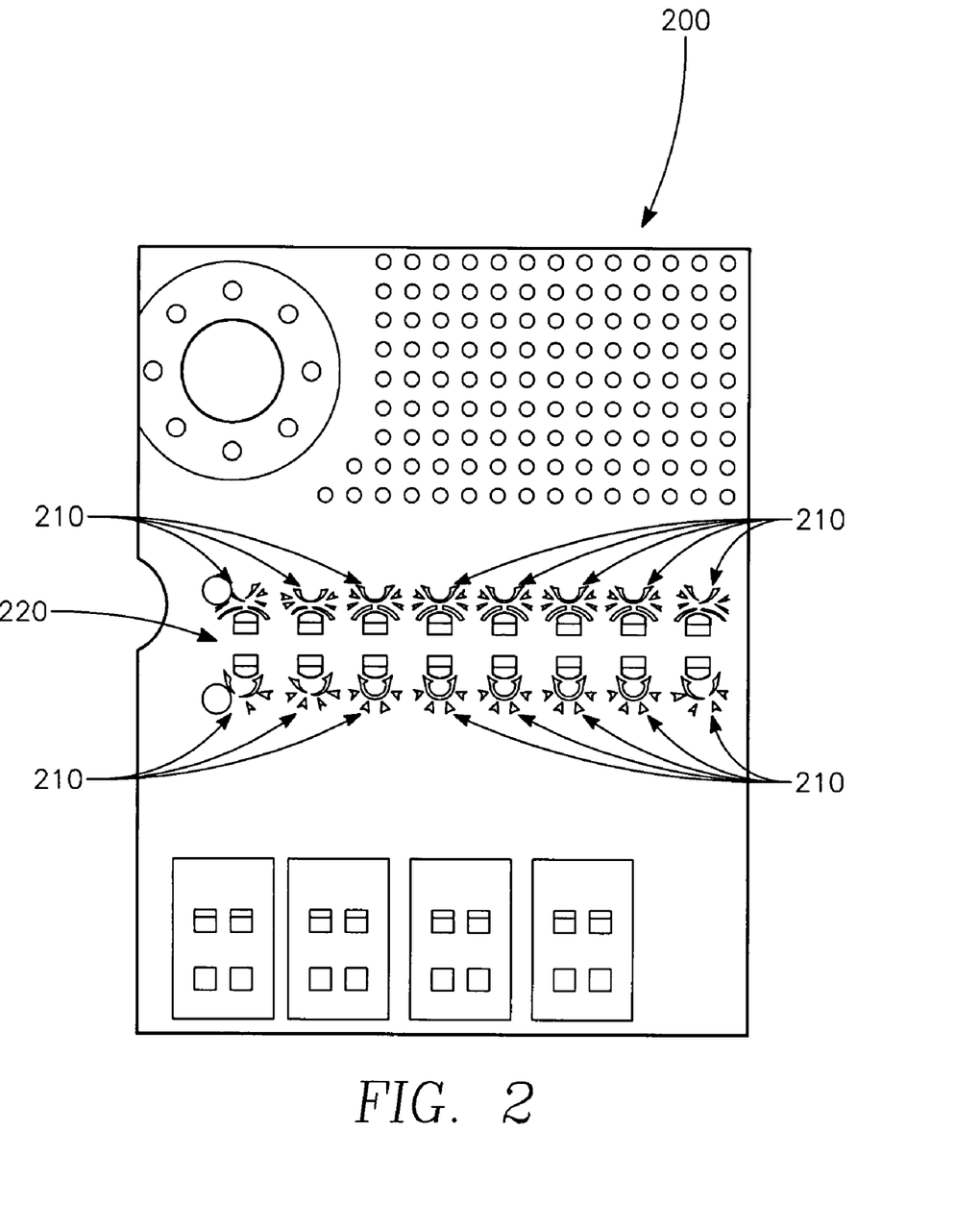
FIG. 2 shows a simplified illustration of a portion of a tomosynthetic image slice with reconstruction artifacts.

FIG. 2 shows a simplified illustration of a tomosynthetic image slice 200. As illustrated in FIG. 2, one problem encountered with some methods of tomosynthesis is that reconstruction artifacts 210 can appear in an image slice 200. The artifacts typically appear as white areas (or dark areas, if inverse image polarity) in the slice. In creating tomosynthetic images, the features on/in the circuit board such as ground planes, via holes, or other features, can create the reconstruction artifacts 210 in the tomosynthetic slices.

The artifacts 210 create several problems. First, the printed circuit boards are typically warped, so it is difficult to determine what level needs to be inspected. To find the level that needs to be inspected, the slices are searched across the expected point and to find out which is the best slice to inspect. An algorithm may be used to search the slices, for example the Zfind method disclosed in U.S. Pat. No. 7,013,038, by Rohit Patnaik, entitled METHOD FOR INSPECTING A BGA JOINT, issued Mar. 14, 2006, herein incorporated by reference in it entirety. The artifacts 210 contribute to the signal-to-noise ratio of the slice making it more difficult to isolate the best slice to examine. This can cause an isolation/search algorithm, such as Zfind, or other algorithm, to be unreliable. Thus, what is needed is a way to eliminate the artifacts.

Second, if there is noise in the final slice, a variety of measurement are made, typically about 30 different measurements for each solder connection. If there is noise in the final slice, it adds to the noise to the various measurements taken of the solder connections. With less noise, there could be more reliable results, with greater divergence of measurements results, to allow easier and clearer identification of good solder joints from bad ones. So, what is needed is a way to reduce artifacts to provide greater differentiation between good and bad solder connections.

SUMMARY

In one implementation, a method for reducing reconstruction artifacts in a slice constructed of a plurality of images is provided. The method may include identifying pixels in images that are in a selected range. The identified pixels are replaced the with a substitute pixel value. The images with the substitute pixel values are combined to form a combined image having reduced reconstruction artifacts. Additional implementations and embodiments are also disclosed and claimed herein.

BRIEF DESCRIPTION OF THE DRAWINGS

The features and advantages of the present invention will be better understood with regard to the following description, appended claims, and accompanying drawings where:

DESCRIPTION

Figure 3:
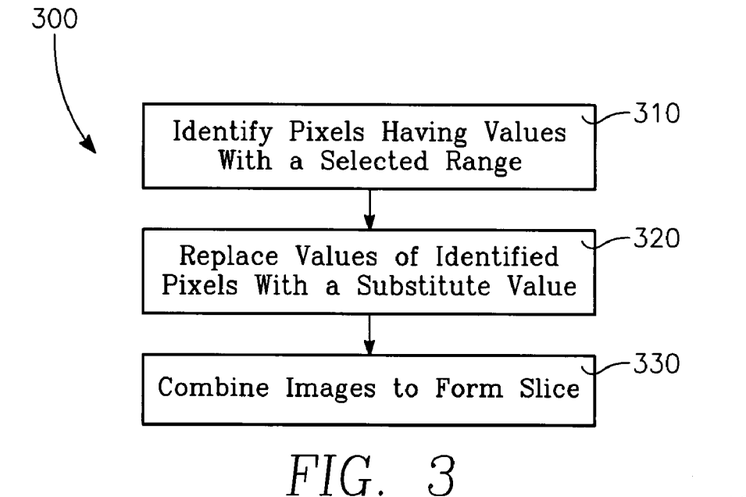
FIG. 3 shows a simplified flow diagram of a possible implementation of the present invention.

FIG. 3 shows a simplified flow diagram 300 of a possible implementation of the present invention. In this implementation, the artifacts are removed from the image slice, by modifying the images 1-8 (FIG. 1) prior to combining images 1-8 (FIG. 1). To remove the artifacts, the pixels having values within a selected range are identified 310 in each image 1-8. The identified pixels are each replaced 320 with a substitute pixel value. The images 1-8 with the substitute pixel values are combined 330 to form a slice without reconstruction artifacts. The images may be combined using standard tomosynthetic techniques.

Figure 4:
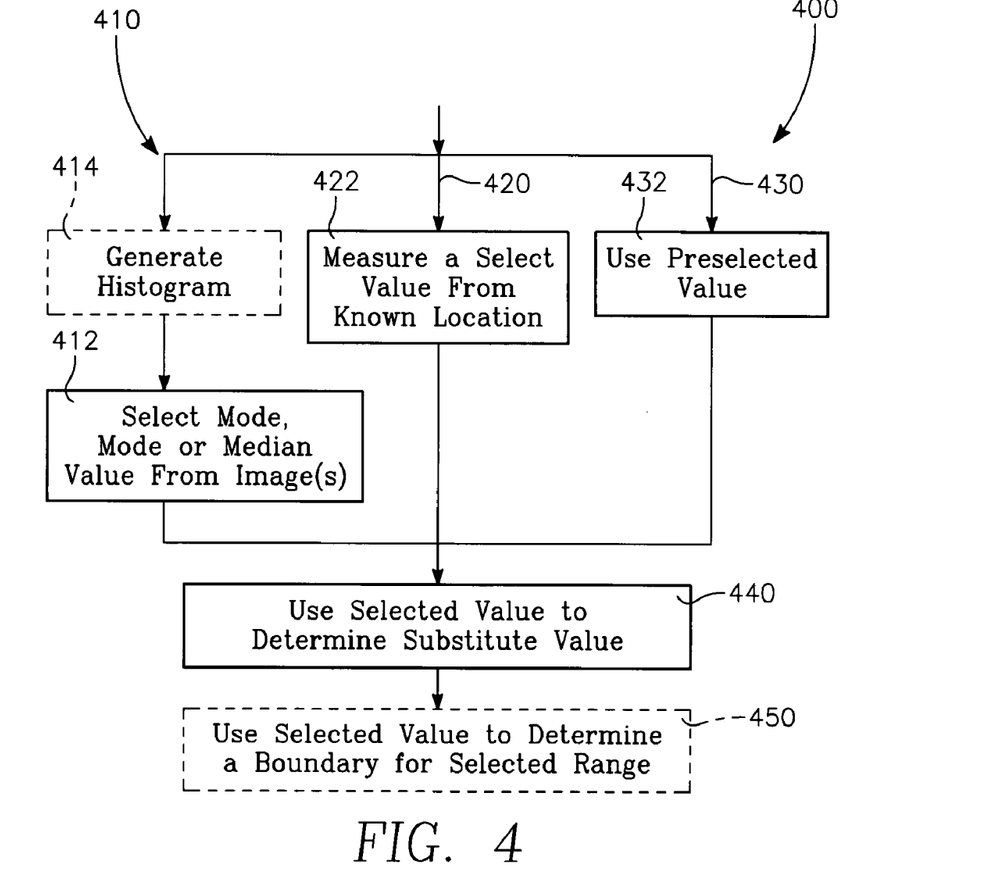
FIG. 4 shows a simplified flow diagram illustrating a possible implementations for determining the substitute value.

FIG. 4 shows a simplified flow diagram 400 illustrating a possible implementations for determining the substitute value. Various alternative techniques may be used to select a substitute value. In one potential technique is shown in branch 410. In this implementation, a value may be selected 412 that represents a mode or majority of the pixels in an image, or in the several images. In most embodiments, the mode value will represent the bare printed circuit board value (the board without any features, i.e. traces, vias, components, etc.), shown as 220 in FIG. 2.

Thus, this may be accomplished by examining the pixel values of one or more of images 1-8 (FIG. 1). A majority of the pixels in most images will be the bare board of the printed circuit board. One optional way to identify the pixel intensity of the bare board, is to generate 414 a histogram of the image showing the distribution of the pixel gray values of the entire image. The mode or most frequently occurring pixel value may be selected and used 440 to determine, or to replace, the identified 310 (FIG. 3) pixels that are within the selected range. Thus, the bin with most pixels would be the selected as the mode of the histogram.

In an alternate implementation shown in branch 420, a pixel value from a known location, such as 220 on the printed circuit board 200 (FIG. 2), may be measured 422 and used 440 to determine the substitute value, which may include using the measured value itself as the substitute value. In yet another alternate implementation shown in branch 430, a preselected value may be used 440 as the selected value to determine the substitute value, which includes using the measured value itself as the substitute value. As such, the pixel value from a known location 220 or region on the board, or a preselected measured, or arbitrary value could be used to replace 320 (FIG. 3) the pixel values within the selected range.

Also illustrated in box 412, in other implementations, another image pixel related value, such as the mean, or the median, may be selected rather than the mode value. The average or mean pixel value of the image could be used to determine a substitute value (which may be the measured value) for the identified 310 (FIG. 3) pixels that are within the selected range. In yet another implementation, the median or middle pixel value may be selected to determine a substitute value (which may be the measured value) to replace the identified 310 (FIG. 3) pixels that are within the selected range.

Furthermore, it is possible to determine a substitute value from/for each image. Values could be input manually, or placed into an input file for retrieval.

Also shown in FIG. 4, optionally the substitute value may be used 450 to determine a boundary for the selected range.

This includes that the range boundary may be the same as the substitute value. The other range boundary may be an extreme pixel value as discussed below.

The range should be such that the pixels selected for replacement should be in a range that removes the pixels that will produce the reconstruction artifacts, while allowing voids in the solder to be detected. For example, in a gray scale image, the bare board is darker than the pixels that will produce the reconstruction artifacts, but lighter than the solder connection with the void. Thus, the bare board value can be used to replace the pixels that will produce the artifacts. Moreover, the substitute value should have a value that is less extreme than the pixels that will produce the artifacts.

In some implementations, the substitute value may be used as a range boundary for the selected range. For example, the images 1-8 (FIG. 1) may be gray scale images with pixels ranging from 0 to 4095, where 0 is black and 4095 is white. Once the substitute value is selected, for example if the mode value is 3000, the selected replacement range for pixels could be 3000 to 4095. In this example, the artifacts would have appeared as white spots in the slice, as shown in FIG. 2. Depending on the image polarity, the artifacts could appear black. In such a case, the selected range could be from 0 to 1000, for example.

In other implementations, a range boundary value different from the substitute value may be used. Similarly, a substitute value maybe outside, or inside the selected range, so long as it does not cause any solder voids to become indistinguishable.

Figure 5:
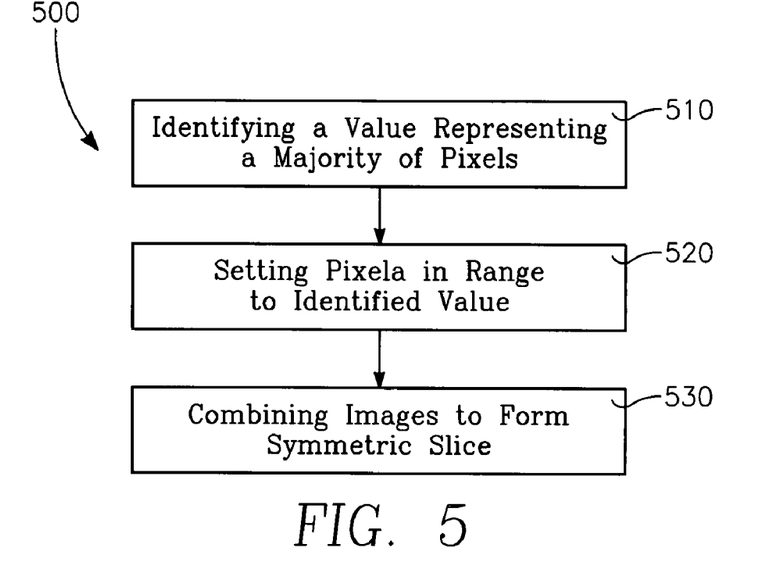
FIG. 5 shows a simplified flow diagram illustrating a possible implementation of the present invention.

FIG. 5 is a simplified flow diagram 500 of one of many possible implementations. In this example, gray scale images are processed, or inspected, to identify 510 a value representing a majority of the pixels in the image. Pixels from the image within a range are set 520 to the identified gray scale value. This is performed for all images that will form the tomosynthetic slice and then the images are combined 530 to form the tomosynthetic slice.

Some of the above implementations allow a search algorithm used to identify defects in a printed circuit board, such as the Zfind algorithm discussed above, or other algorithm known in the art, to provide more reliable results. As such, implementations discussed above are not limited to Zfind and may be used to improve other defect identification techniques and algorithms.

The above implementations could be utilized in a variety of image processing equipment. This includes integrated image processing equipment, or image processing equipment that is separate from the imaging equipment. In one embodiment, the above method could be implemented in an X Station MX printed circuit board inspection tool, available from Teradyne, Inc. of Boston, Mass.

Figure 6:
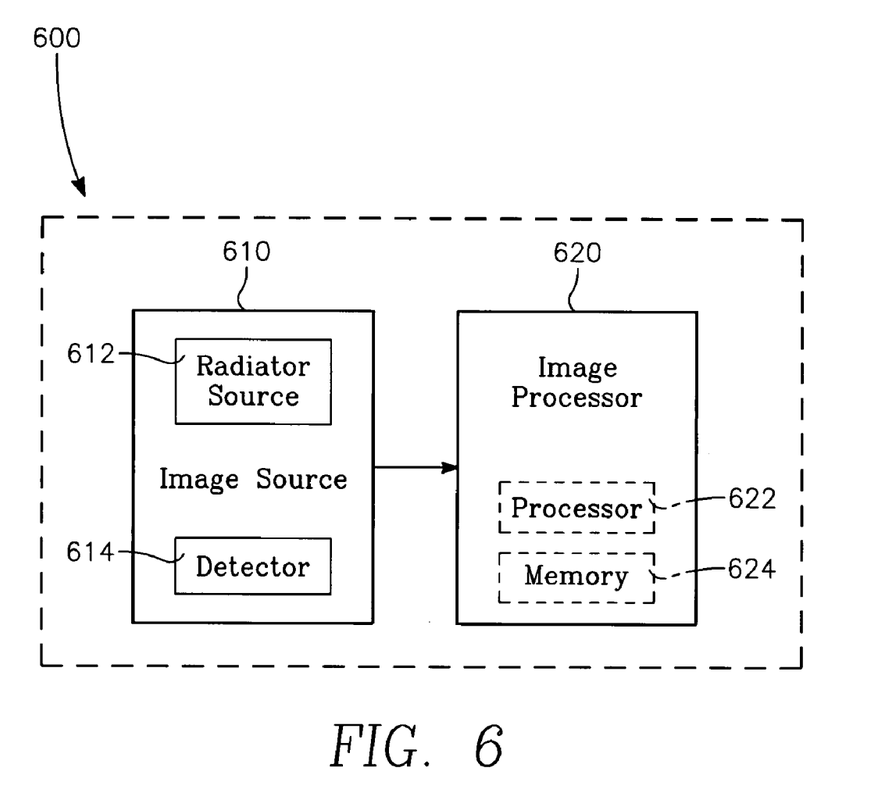
FIG. 6 shows a simplified block diagram of one possible embodiment of a printed circuit board inspection tool apparatus.

FIG. 6 shows a simplified block diagram of one possible embodiment of a printed circuit board inspection tool apparatus 600. A printed circuit board (not shown) is loaded in the apparatus 600 and an imaging source 610, which typically includes a radiation source 612 and a detector 614, acquires images of the board (optionally stores the images) and provides imaging information to the image processor 620, which typically includes a processor 622 and memory 624. The processor 622 is programmed to replace the reconstruction artifact precursors as discussed herein. The image processor creates a combined image from the individual images after the reconstruction artifact precursor pixels have be replaced, and then analyzes the constructed images, run diagnostics, notes the location of defects or potential defects, accepts or rejects boards, and/or provides results via a user interface (not shown), if desired.

Figure 7:
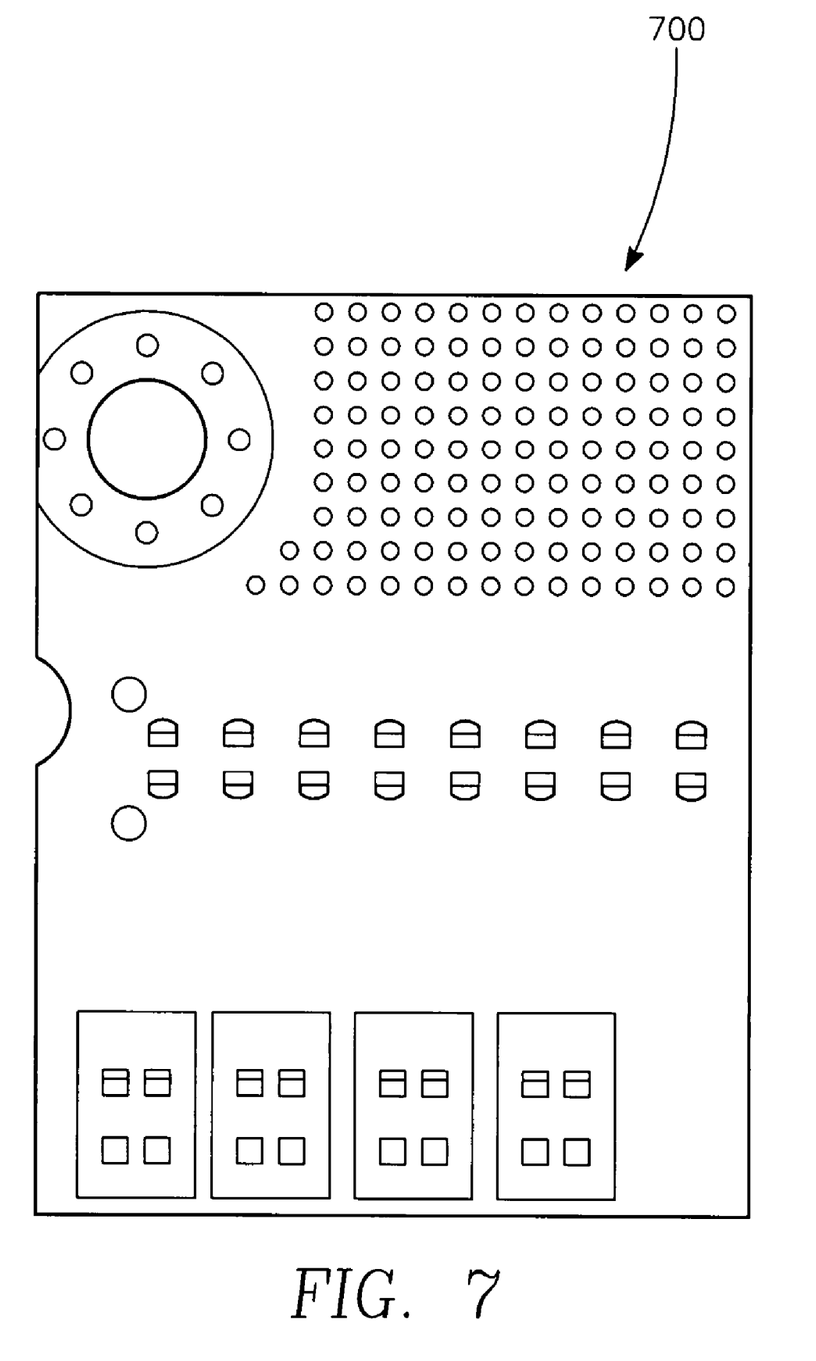
FIG. 7 shows a simplified illustration of a portion of a tomosynthetic image slice after processing to remove the reconstruction artifacts.

FIG. 7 shows a simplified illustration of a portion of a tomosynthetic image slice 700 after it has been processed in accordance with the present invention to remove the reconstruction artifacts.

Various implementations may be applied to remove reconstruction artifacts from any type of slice, for example from the horizontal and/or vertical slices disclosed in U.S. Pat. No. 6,99,265, by Rohit Patnaik, entitled INSPECTION METHOD UTILIZING VERTICAL SLICE IMAGING, issued Feb. 7, 2006; and U.S. Pat. No. 7,013,038, by Rohit Patnaik, entitled METHOD FOR INSPECTING A BGA JOINT, issued Mar. 14, 2006; both herein incorporated by reference in their entireties.

Furthermore, various implementations are not limited to tomosynthesis. For example, artifacts may be removed from images before other forms of image reconstruction. It should be realized that in other reconstructive methods where several static images are used to construct a final constructed slice, various implementations discussed above may be applied to remove the reconstruction artifacts from the slice. Furthermore, although the term "slice" is used herein for illustration purposes, "slice" is meant to encompass 3D representation images, holographic images, or the like, and other combined images and/or reconstructed/constructed images.

Having described this invention in connection with a number of embodiments, modification will now certainly suggest itself to those skilled in the art. As such, the invention is not to be limited to the disclosed embodiments, except as required by the appended claims.

What is claimed is:

1. A method for reducing reconstruction artifacts in a combined image constructed of a plurality of images, the method comprising:
    a) selecting a boundary pixel value of a selected range of pixel values, wherein selecting the boundary pixel value comprises selecting one of: (i) a mean pixel value of a first image; or (ii) a median pixel value of the first image;
    b) identifying pixels in each of the plurality of images, each of the identified pixels having a pixel value within the selected range, the plurality of images being for a region of interest acquired at different angles;
    c) replacing the identified pixels with a substitute pixel value; and
    d) combining the plurality of images comprising the substitute pixel value to form a combined image having reduced reconstruction artifacts.

2. The method of claim 1 further comprising selecting the substitute pixel value, wherein selecting the substitute pixel value comprises using a value representing a background portion of an image without any artifact producing feature.

3. The method of claim 2, wherein selecting the substitute pixel value comprises using a value for each of the plurality of images representing a background portion of that image without any artifact producing feature.

4. The method of claim 1 further comprising:
    e) generating a histogram of pixel values of a second image selected from the plurality of images;
    f) identifying a mode value of the pixel values of the second image using the histogram; and
    g) determining the substitute pixel value using the mode value.

5. The method of claim 4 comprising using the mode value as the substitute pixel value for said second image.

6. The method of claim 1, further comprising:
    e) generating a histogram of pixel values of the plurality of images;

f) identifying a collective mode value of the plurality of images using the histogram; and g) using the collective mode value of the plurality of images as the substitute pixel value.

7. The method of claim 1 further comprising selecting the substitute pixel value, and wherein selecting the substitute pixel value comprises selecting one of: (i) a mode pixel value; (ii) the mean pixel value; or (iii) the median pixel value of the first image.

8. The method of claim 1 further comprising selecting the substitute pixel value, and wherein selecting the substitute pixel value comprises selecting a pixel value of a known location on a printed circuit board being imaged.

9. The method of claim 1, wherein selecting the boundary pixel value comprises using the substitute pixel value.

10. The method of claim 9, wherein using the substitute pixel value comprises using the substitute pixel value as the boundary value.

11. The method of claim 1, wherein the boundary pixel value comprises a value representing an intensity of a bare portion of a printed circuit board being imaged.

12. A method for reducing reconstruction artifacts in a combined image constructed of a plurality of images, the method comprising:
   a) selecting a boundary pixel value of a selected range of pixel values, wherein selecting the boundary pixel value comprises:
      (i) generating a histogram of a first image;
      (ii) identifying a mode pixel value of the first image, wherein the mode pixel value is related to the intensity of a bare portion of a printed circuit board being imaged;
      (iii) using the mode pixel value to determine the boundary pixel value;
   b) identifying pixels in each of the plurality of images, each of the identified pixels having a pixel value within the selected range, the plurality of images being for a region of interest acquired at different angles;
   c) replacing the identified pixels with a substitute pixel value; and
   d) combining the plurality of images comprising the substitute pixel value to form a combined image having reduced reconstruction artifacts.

13. The method of claim 1 wherein pixel values of the identified pixels represent gray scale values.

14. A method for reducing reconstruction artifacts in a combined image constructed of a plurality of images, the method comprising:
   a) generating a histogram of an image;
   b) selecting a pixel value representing a majority of pixels in the image;
   c) determining a substitute pixel value using the selected pixel value;
   d) identifying pixels in each of the plurality of images in a selected range;
   e) replacing the identified pixels with the substitute pixel value; and
   f) combining the plurality of images comprising the substitute pixel value to form the combined image having reduced reconstruction artifacts.

15. The method of claim 14 further comprising using the substitute pixel value to determine a boundary value for the selected range.

16. The method of claim 15, wherein using the substitute value comprises using the substitute value as the boundary value.

17. The method of claim 15, wherein the plurality of images comprises the image.

18. The method of claim 15 further comprising generating a histogram for the plurality of images and using a mode value of the plurality of images as the substitute pixel value.

19. A method for reducing reconstruction artifacts in a slice constructed of a plurality of images, the method comprising:
   a) identifying a gray scale value representing a majority of pixels in each of the plurality of images;
   b) setting pixels having a gray scale value falling in a range that is one of: (1) above; or (2) below the identified gray scale value to the identified gray scale value in each of the plurality of images; and
   c) combining the plurality of images to form a tomosynthetic slice.

20. The method of claim 19, wherein identifying a gray scale value comprises generating a histogram of the image.

21. A printed circuit board inspection apparatus comprising:
   an imaging source configured to acquire a plurality of images of a printed circuit board; and
   an image processor configured to reduce reconstruction artifacts in a combined image constructed of the plurality of images, the image processor configured to:
      a) identify pixels meeting a selected criteria in each of the plurality of images, the plurality of images being for a region of interest acquired at different angles, the selected criteria relating to a mean pixel value or median pixel value of a first image of the plurality of images;
      b) replace the identified pixels with a substitute pixel value; and
      c) combine the plurality of images comprising the substitute pixel value to form a combined image having reduced reconstruction artifacts.

22. The apparatus of claim 21, wherein the image processor is further configured to select the substitute pixel value using a value representing a background portion of an image without any artifact producing feature.

23. The apparatus of claim 22, wherein the image processor is further configured to select the substitute pixel value using a value for each of the plurality of images representing a background portion of a respective image without any artifact producing feature.

24. The apparatus of claim 23, wherein the image processor is further configured to:
   d) generate a histogram of an image;
   e) identify a mode value; and
   f) determine the substitute pixel value using the mode value.

25. The apparatus of claim 23, wherein the plurality of images comprises the image and wherein the image processor is further configured to use a mode value as the substitute pixel value for the image.

26. The apparatus of claim 23, wherein the image processor is further configured to generate a histogram of the plurality of images and use a mode value of the plurality of images as the substitute pixel value.

27. The apparatus of claim 23, wherein the image processor is further configured to select the substitute pixel value from one of: (i) a mean pixel value; or (ii) a median pixel value of an image.

28. The apparatus of claim 22, wherein selecting the substitute pixel value comprises selecting a pixel value of a known location of the printed circuit board being imaged.

29. The apparatus of claim 22, wherein the image processor is further configured to identify pixels in a selected range.

30. The apparatus of claim 29, wherein the image processor is further configured to use the substitute value to determine a range boundary value for the selected range.

31. The apparatus of claim 30, wherein using the substitute pixel value comprises using the substitute value as the range boundary value.

32. The apparatus of claim 29, wherein the selected range comprises a range boundary comprising a value representing an intensity of a bare portion of the printed circuit board being imaged.

33. The apparatus of claim 32, wherein the image processor is further configured to:
   d) generate a histogram of an image;
   e) identify a mode value; and
   f) use the mode value to determine the range boundary value.

34. The apparatus of claim 32, wherein the range boundary value comprises one of: (i) a mean pixel value; or (ii) a median pixel value of an image.

35. The apparatus of claim 30, wherein the range boundary value comprises a pixel value of a known location on the printed circuit board being imaged.

36. The apparatus of claim 21, wherein the image processor is further configured to select the substitute pixel value using a value representing a bare portion of the printed circuit board being imaged.

37. The apparatus of claim 21, wherein the image processor is further configured to identify an artifact by identifying pixels within a selected gray scale range, and is further configured to replace the pixels within the selected gray scale range with a substitute gray scale value to remove the identified artifact.

38. A printed circuit board inspection apparatus comprising:
   an imaging source configured to acquire a plurality of images of a printed circuit board;
   an image processor configured to reduce reconstruction artifacts in a combined image constructed of the plurality of images, the image processor configured to:
   a) identify a gray scale value representing a majority of pixels in each of the plurality of images;
   b) set pixels having a gray scale value falling in a range that is one of: (1) above; or (2) below the identified gray scale value to the identified gray scale value in each of the plurality of images; and
   c) combine the plurality of images to form a tomosynthetic combined image.

39. The apparatus of claim 38, wherein the image processor is further configured to generate a histogram of each of the plurality of images to identify the gray scale value representing the majority of the pixels.

40. The method of claim 4 wherein the first image and the second image are the same image.

* * * * *